United States Patent
Li

(10) Patent No.: US 8,556,402 B2
(45) Date of Patent: Oct. 15, 2013

(54) FIXER INKS FOR USE WITH INK JET INKS

(75) Inventor: Xiaoqing Li, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 393 days.

(21) Appl. No.: 12/937,575

(22) PCT Filed: May 20, 2009

(86) PCT No.: PCT/US2009/044659
§ 371 (c)(1),
(2), (4) Date: Oct. 13, 2010

(87) PCT Pub. No.: WO2009/143233
PCT Pub. Date: Nov. 26, 2009

(65) Prior Publication Data
US 2011/0032303 A1    Feb. 10, 2011

Related U.S. Application Data

(60) Provisional application No. 61/055,182, filed on May 22, 2008.

(51) Int. Cl.
*C09D 11/00* (2006.01)

(52) U.S. Cl.
USPC ............................................................ 347/100

(58) Field of Classification Search
USPC ............................................................ 347/100
See application file for complete search history.

(56) References Cited

U.S. PATENT DOCUMENTS

| | | | |
|---|---|---|---|
| 3,412,054 A | 11/1968 | Milligan et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,231,131 A | 7/1993 | Chu et al. | |
| 5,272,201 A | 12/1993 | Ma et al. | |
| 5,310,778 A | 5/1994 | Shor et al. | |
| 5,519,085 A | 5/1996 | Ma et al. | |

(Continued)

FOREIGN PATENT DOCUMENTS

| | | |
|---|---|---|
| EP | 0556649 | 2/1993 |
| EP | 1122286 | 6/2000 |

(Continued)

OTHER PUBLICATIONS

Wojciech Zeslawski, Authorized Officer, Written Opinion of the International Searching Authority in PCT/US2009/044659, WO/2009/143233, PCT counterpart of the present application, European Patent Office, Munich DE, Nov. 22, 2010.

*Primary Examiner* — Laura Martin

(74) *Attorney, Agent, or Firm* — Simon L. Xu; John H. Lamming

(57) ABSTRACT

The disclosure provides an ink set containing an ink jettable ink and an ink jettable fixer ink having: an aqueous colorant containing ink jettable ink; and a fixer ink having: (i) a multivalent metal salt, wherein the metal is selected from the group consisting of divalent metal ions, trivalent metal ions, and mixtures thereof; and (ii) a salt stable, water soluble, predominantly non-ionic, polymeric binder selected from the group consisting of a polyurethane having an ethylene oxide unit, and a methoxylated carboxylated polyallylamine; wherein the polymeric binder is substantially non-reactive with the colorant. The colorant contains a dye, a self dispersed pigment or a pigment dispersion. These inks have enhanced coloristic and durability properties.

20 Claims, 1 Drawing Sheet

(56) References Cited

U.S. PATENT DOCUMENTS

| | | | |
|---|---|---|---|
| 5,554,739 A | 9/1996 | Belmont | |
| 5,571,311 A | 11/1996 | Belmont et al. | |
| 5,609,671 A | 3/1997 | Nagasawa | |
| 5,648,405 A | 7/1997 | Ma et al. | |
| 5,672,198 A | 9/1997 | Belmont | |
| 5,679,138 A | 10/1997 | Bishop et al. | |
| 5,698,016 A | 12/1997 | Adams et al. | |
| 5,707,432 A | 1/1998 | Adams et al. | |
| 5,718,746 A | 2/1998 | Nagasawa et al. | |
| 5,747,562 A | 5/1998 | Mahmud et al. | |
| 5,749,950 A | 5/1998 | Mahmud et al. | |
| 5,753,016 A | 5/1998 | Hayashi et al. | |
| 5,803,959 A | 9/1998 | Johnson et al. | |
| 5,837,045 A | 11/1998 | Johnson et al. | |
| 5,846,307 A | 12/1998 | Nagasawa et al. | |
| 5,851,280 A | 12/1998 | Belmont et al. | |
| 5,861,447 A | 1/1999 | Nagasawa et al. | |
| 5,885,335 A | 3/1999 | Adams et al. | |
| 5,891,231 A | 4/1999 | Gnerlich et al. | |
| 5,895,522 A | 4/1999 | Belmont et al. | |
| 5,922,118 A | 7/1999 | Johnson et al. | |
| 5,928,419 A | 7/1999 | Uemura et al. | |
| 5,976,232 A | 11/1999 | Gore | |
| 5,976,233 A | 11/1999 | Osumi et al. | |
| 6,057,384 A | 5/2000 | Nguyen et al. | |
| 6,099,632 A | 8/2000 | Nagasawa et al. | |
| 6,117,921 A | 9/2000 | Ma et al. | |
| 6,123,759 A | 9/2000 | Mise et al. | |
| 6,153,001 A | 11/2000 | Suzuki et al. | |
| 6,221,141 B1 | 4/2001 | Takada et al. | |
| 6,221,142 B1 | 4/2001 | Wang et al. | |
| 6,221,143 B1 | 4/2001 | Palumbo | |
| 6,262,152 B1 | 7/2001 | Fryd et al. | |
| 6,277,183 B1 | 8/2001 | Johnson et al. | |
| 6,277,184 B1 | 8/2001 | Kato | |
| 6,281,267 B2 | 8/2001 | Parazak | |
| 6,306,994 B1 | 10/2001 | Donald et al. | |
| 6,329,446 B1 | 12/2001 | Sacripante et al. | |
| 6,332,919 B2 | 12/2001 | Osumi et al. | |
| 6,375,317 B1 | 4/2002 | Osumi et al. | |
| 6,433,117 B1 | 8/2002 | Ma et al. | |
| 2001/0035110 A1 | 11/2001 | Kato | |
| 2003/0089277 A1 | 5/2003 | Zakheim et al. | |
| 2004/0223040 A1* | 11/2004 | Graham et al. | 347/105 |
| 2005/0231573 A1* | 10/2005 | Bruinsma et al. | 347/96 |
| 2006/0012627 A1* | 1/2006 | Nakazawa et al. | 347/21 |
| 2007/0216742 A1* | 9/2007 | Sarkisian et al. | 347/100 |

FOREIGN PATENT DOCUMENTS

| | | |
|---|---|---|
| EP | 1086997 | 9/2000 |
| EP | 1114851 | 1/2001 |
| EP | 1158030 | 5/2001 |
| EP | 1167471 | 6/2001 |
| EP | 1486541 | 12/2004 |
| JP | 2005008948 A * | 1/2005 |
| JP | 2005/089488 | 7/2005 |
| WO | 01/10963 | 2/2001 |
| WO | 01/25340 | 4/2001 |
| WO | 01/94476 | 6/2001 |
| WO | 2006/074483 | 7/2006 |

* cited by examiner

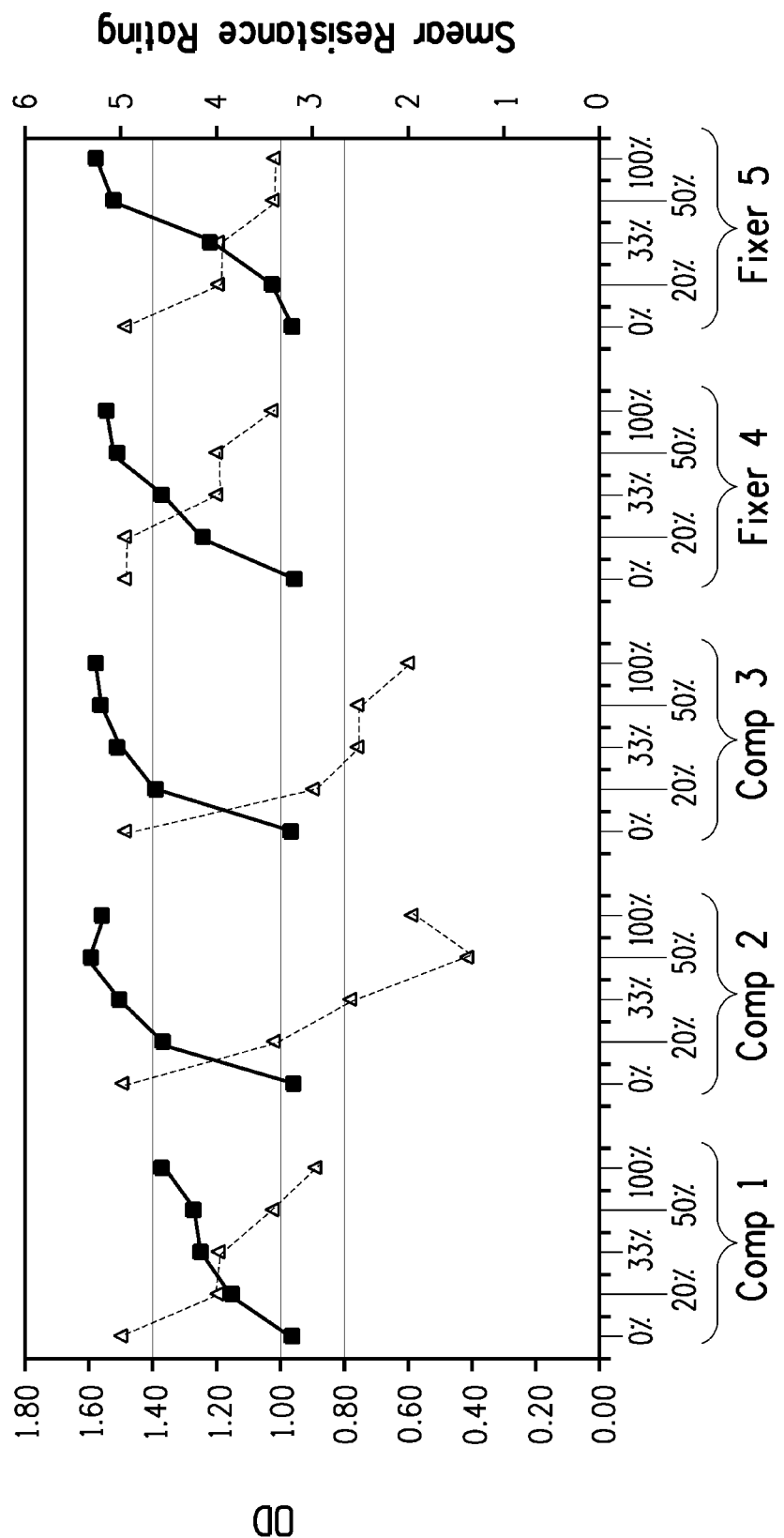

FIXER INKS FOR USE WITH INK JET INKS

BACKGROUND OF THE DISCLOSURE

1. Field of the Disclosure

This disclosure relates to aqueous dispersions, and in particular to fixer inks for use with ink jet inks and methods of printing substrates.

2. Description of Related Art

Ink jet printing is a non-impact printing process in which droplets of ink are deposited on a substrate, such as paper or textile, to form the desired image. The droplets are ejected from a printhead in response to electrical signals generated by a microprocessor.

Most inkjet printers are equipped with an ink set comprising two or more different inks and are able to print black text and multicolor images. Typically, an ink set will comprise at least a cyan, magenta and yellow colored ink and a black ink (CMYK ink set).

For printing text, it is desirable for the black ink to have high optical density. For this purpose, a pigment colorant is most advantageous, especially a carbon black pigment. A pigment colorant is not soluble in the ink vehicle and must be treated in order to cause it to remain dispersed and jet properly. To effect dispersion stability, pigments are commonly treated with dispersants, and a wide variety of such materials have been disclosed. Especially effective are block copolymer dispersants which are described, for example, in U.S. Pat. Nos. 5,085,698, 5,519,085, 5,272,201, and 5,648,405. Amphoteric (sometimes referred to as polyampholyte) dispersants, i.e., dispersants containing moieties capable of reacting with acidic and basic reagents, for improved dispersion stability, have also been described. For example, U.S. Pat. No. 5,648,405 discloses an amphoteric dispersant formed of MAA/DMAEMA/BZMA random copolymer.

Typically substrates onto which images are printed are porous, eg. Paper or textile, and the printed image has a tendency to be absorbed into the substrate resulting in an image that has lower optical density. It is desirable for the image to sit on the surface of the substrate to improves its optical density, but it is also a requirement that this image be held in place to minimize or eliminate ink smear.

Despite the successful inkjet inks and print methods presently available, there is still a need for ink jet printed images having good optical density in combination with improved smear resistance.

SUMMARY OF THE DISCLOSURE

In a first aspect, the disclosure provides an ink set for ink jet printing, comprising:
an aqueous colorant containing ink jet ink;
a fixer ink comprising:
  (i) a multivalent metal salt, wherein the metal is selected from the group consisting of divalent metal ions such as $Ga^{2+}$, $Cu^{2+}$, $Ni^{2+}$, $Mg^{2+}$, $Zn^{2+}$ and $Ba^{2+}$, trivalent metal ions, such as $Al^{3+}$, $Fe^{3+}$ and $Cr^{3+}$, and mixtures thereof; and
  (ii) a salt stable, water soluble, predominantly non-ionic, polymeric binder selected from the group consisting of a polyurethane comprising an ethylene oxide unit, and a methoxylated carboxylated polyallylamine; wherein the polymeric binder is substantially non-reactive with the colorant.

The colorant comprises a dye, a self dispersed pigment or a pigment dispersion. By 'polymeric binder is substantially non-reactive with the colorant' it is meant that the solution of the salt stable, water soluble, predominantly non-ionic, polymeric binder does not coagulate (gel) or precipitate when mixed with the ink.

In a second aspect, the disclosure provides a method for printing a substrate comprising:
(a) providing an ink set, comprising:
an aqueous colorant containing ink jet ink;
a fixer ink comprising:
  (i) a multivalent metal salt, wherein the metal is selected from the group consisting of divalent metal ions such as $Ga^{2+}$, $Cu^{2+}$, $Ni^{2+}$, $Mg^{2+}$, $Zn^{2+}$ and $Ba^{2+}$, trivalent metal ions, such as $Al^{3+}$, $Fe^{3+}$ and $Cr^{3+}$, and mixtures thereof; and
  (ii) a salt stable, water soluble, predominantly non-ionic, polymeric binder selected from the group consisting of a polyurethane comprising an ethylene oxide unit, and a methoxylated carboxylated polyallylamine; wherein the polymeric binder is substantially non-reactive with the colorant;
(b) applying the ink jettable fixer ink to the substrate, and
(c) applying the aqueous colorant containing ink jet ink to the substrate.

These and other features and advantages of the present disclosure will be more readily understood by those of ordinary skill in the art from a reading of the following detailed description. It is to be appreciated that certain features of the disclosure which are, for clarity, described above and below in the context of separate embodiments, may also be provided in combination in a single embodiment. Conversely, various features of the disclosure that are, for brevity, described in the context of a single embodiment, may also be provided separately or in any subcombination. In addition, references in the singular may also include the plural (for example, "a" and "an" may refer to one, or one or more) unless the context specifically states otherwise.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range. It is to be appreciated that certain features of the disclosure which are, for clarity, described above and below in the context of separate embodiments, may also be provided separately or in any subcombination.

In one embodiment, the disclosure herein can be construed as excluding any element or process step that does not materially affect the basic and novel characteristics of the composition or process. Additionally, the disclosure can be construed as excluding any element or process step not specified herein.

BRIEF DESCRIPTION OF THE FIGURE

FIG. 1 is a plot of optical density vs. smear resistance for the inks of the examples. The filled boxes are the optical density (OD) measurements and the triangles are smear resistance ratings.

DETAILED DESCRIPTION OF THE DISCLOSURE

Fixer inks are used in combination with aqueous colorant containing ink jet inks to give images that have enhanced coloristic and durability properties and, in particular, smear resistance.

Fixer Ink:

The fixer ink comprises a mixture of a multivalent metal salt and a salt stable, water soluble, predominantly non-ionic, polymeric binder. The fixer ink may be jetted under and/or over a colored ink. Generally a fixer for pigment based inks is designed to increase chroma and/or optical density. However, fixer inks may also have other additional unspecified beneficial effects.

Fixer inks typically further comprises an aqueous vehicle. Fixer inks can also comprise additives such as one or more surfactants or biocides or mixtures thereof. To minimize the liquid load on the substrate, the fixer ink(s) are typically formulated to be effective at volumes equal to or less than the volume of colored ink being fixed. Typically, although not necessarily, the drop volume of the fixer ink(s) will be the same as the colored ink(s) and thus, typically, there will be no more than about one drop of fixer ink for each drop of colored ink. Fixer inks are generally also substantially colorless and do not perceptibly or substantially change the hue of a colored ink being fixed.

Fixing Agents

Fixing agents are most commonly designed to operate by electrostatic interaction with the colorant. Thus, an anionic dye or pigment dispersion is treated with a cationic fixing agent, or a cationic colorant is treated with anionic fixing agent, thereby immobilizing or "fixing" the colorant. This process is sometimes referred to in the art as "insolubilizing", "precipitating" or "crashing" the colorant.

The metal in the multivalent metal salt is selected from the group consisting of divalent metal ions and trivalent metal ions, and mixtures thereof. Divalent metal ions are selected from the group consisting of $Ga^{2+}$, $Cu^{2+}$, $Ni^{2+}$, $Mg^{2+}$, $Zn^{2+}$ and $Ba^{2+}$ and trivalent metal ions are selected from the group consisting of $Al^{3+}$, $Fe^{3+}$ and $Cr^{3+}$. Typically, the multivalent metal is a divalent metal ion selected from the group consisting of $Ca^{2+}$ and $Mg^{2+}$ or a trivalent metal ion such as $Al^{3+}$. The multivalent metal salt is present in the amount of about 0.5% to about 15%, more typically about 1% to about 8%, based on the total weight of the fixer ink. The multivalent metal ion can be incorporated into fixer ink by addition in a salt form. The associated anionic material can be chosen from any common anionic material, especially halides such as chloride, bromide, iodide and fluoride, nitrates and sulfates. The anionic form is chosen so that the multivalent cation is soluble in the aqueous solution. The multivalent cationic salts can be used in their hydrated form. One or more multivalent cationic salts may be used in the pretreatment solution.

For calcium ion, the preferred multivalent cation salts are calcium chloride, calcium nitrate, calcium nitrate hydrate and mixtures thereof.

Non-Ionic Polymeric Binder

The salt stable, water soluble, predominantly non-ionic, polymeric binder is selected from the group consisting of a polyurethane comprising an ethylene oxide unit, and a methoxylated carboxylated polyallylamine; wherein the polymeric binder is substantially non-reactive with the colorant. Typically the polyurethane comprising an ethylene oxide unit is water soluble, and predominantly non-ionic, and may have an average number molecular weight of between about 5000 to about 25,000, more typically about 7,000 to about 20,000.

Examples of suitable water soluble polyurethanes are those in which the polymer is predominantly stabilized through one or more incorporated ethylene oxide units which provide nonionic functionality. Suitable polyurethanes are typically prepared by multi-step synthetic processes. In the first stage of prepolymer formation, a diisocyanate is reacted with a compound, polymer, or mixtures of compounds, mixture of polymers or a mixture thereof, each containing two NCO-reactive groups. This intermediate polymer or pre-polymer can be terminated with either an NCO-group or a NCO-reactive group. The terminal groups are defined by the molar ratio of NCO to NCO-reactive groups in the prepolymer stage. Typically, the pre-polymer is an NCO-terminated material that is achieved by using a molar excess of NCO. Thus, the molar ratio of diisocyanate to compounds containing two isocyanate-reactive groups is about 1.05:1.0 to about 5.0:1.0, typically about 1.10:1.0 to about 2.0:1.0. In general compounds containing NCO-reactive groups are hydrophilic compounds with OH groups including non-ionic and anioinic or cationic segments and polyols with OH groups.

Suitable diisocyanates are those that contain either aromatic, cycloaliphatic or aliphatic groups bound to the isocyanate groups. Mixtures of these compounds may also be used. The preferred is a prepolymer that has isocyanates bound to a cycloaliphatic or aliphatic moieties. If aromatic diisocyanates are used, cycloaliphatic or aliphatic isocyanates are typically present as well.

Examples of suitable diisocyanates include cyclohexane-1,3- and -1,4-diisocyanate; 1-isocyanato-3-isocyanatomethyl-3,5,5-trimethyl-cyclohexane (isophorone diisocyanate or IPDI); bis-(4-isocyanatocyclohexyl)-methane; 1,3- and 1,4-bis-(isocyanatomethyl)-cyclohexane; 1-isocyanato-2-isocyanatomethyl cyclopentane; 2,4'-diisocyanato-dicyclohexyl methane; bis-(4-isocyanato-3-methyl-cyclohexyl)-methane, alpha,alpha,alpha',alpha'-tetramethyl-1,3- and/or -1,4-xylylene diisocyanate; 1-isocyanato-1-methyl-4(3)-isocyanatomethyl cyclohexane; and 2,4- and/or 2,6-hexahydrotoluoylene diisocyanate.

Examples of hydrophilic NCO reactive compounds include a compound containing NCO reactive groups, for example, OH groups and a non-ionic dispersing segment, such as an ethylene oxide or ethylene oxide derivative, e.g., —($(CH_2)_2O)_m$—, wherein m can be from about 1 to about 400, typically from about 5 to about 200. One such example is Tegomer® D3403, a polyether diol with polyethylene glycol pendant chain from Evonik Industries (Essen, Germany).

Suitable polyols containing at least two NCO reactive groups, which may be reacted to prepare the prepolymer, are those having a molecular weight of about 60 to about 6000. Of these, the polymeric polyols are best defined by the number average molecular weight, and can range from about 200 to about 6000, typically about 800 to about 3000, and more typically about 1000 to about 2500. The molecular weights are determined by hydroxyl group analysis (OH number). Examples of these high molecular weight compounds include polyester, polyether, polycarbonates, polyacetals, poly(meth)acrylates, polyester amides, polythioethers or mixed polymers such as a polyester-polycarbonate where both ester and carbonate linkages are found in the same polymer. A combination of these polymers can also be used. For examples, a polyester polyol and a poly(meth)acrylate polyol may be used in the same polyurethane synthesis.

Similar NCO reactive materials can be used as described for hydroxy containing compounds and polymers, but which contain other NCO reactive groups. Examples would be dithiols, diamines, thioamines and even hydroxythiols and hydroxylamines. These can either be compounds or polymers with the molecular weights or number average molecular weights as described for the polyols.

Suitable polyether polyols are obtained in a known manner by the reaction of starting compounds that contain reactive hydrogen atoms with alkylene oxides such as ethylene oxide, propylene oxide, butylene oxide, styrene oxide, tetrahydrofuran, epichlorohydrin or mixtures of these. Suitable starting compounds containing reactive hydrogen atoms include the polyhydric alcohols for preparing polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- and 1,1,2-tris-(hydroxylphenyl)-ethane, dimethylolpropionic acid or dimethylolbutanoic acid. One suitable polyether polyol is Terathane® 1400, a 1400 molecular weight a polytetramethylene oxide polyol from Invista (Wichita, Kans.).

The high molecular weight polyols are generally present in the polyurethanes in an amount of at least about 5%, typically at least about 10% by weight, based on the weight of the polyurethane. The maximum amount of these polyols is generally about 65%, and typically about 55% by weight, based on the weight of the polyurethane.

In addition to the above-mentioned components, which are typically difunctional in the isocyanate polyaddition reaction, mono-functional and even small portions of trifunctional and higher functional components generally known in polyurethane chemistry, such as trimethylolpropane or 4-isocyanantomethyl-1,8-octamethylene diisocyanate, may be used in cases in which branching of the NCO prepolymer or polyurethane is desired. However, the NCO prepolymers should be substantially linear and this may be achieved by maintaining the average functionality of the prepolymer starting components at or below about 2.1, typically between about 1.7 to about 2.

As discussed before, the polyurethanes are typical prepared by chain teminating or extending these NCO containing prepolymers. A suitable method of chain extension is to add polyamine to the NCO-prepolymer before, during or after the pre-polymer inversion into water. Optionally, the chain extension can occur after pre-polymer inversion. The polyamines include 1-amino-3-aminomethyl-3,5,5-trimethylcyclohexane (isophorone diamine or IPDA), bis-(4-aminocyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

In some cases, chain termination is desirable. Chain termination requires the addition, in most cases, of a mono-NCO reactive material such as a monoamine or mono-alcohol.

The materials can be added before, during or after inversion of the prepolymer. Poly-NCO reactive materials can be used where one of the NCO-reactive groups reacts substantially faster than the others. Some examples would be ethanol amine and diethanol amine. The amine group will react much faster with the NCO group than the alcohol.

Suitable chain terminators would be amines or alcohols having an average functionality per molecule of 1, i.e., the number of primary or secondary amine nitrogens or alcohol oxygens would average 1 per molecule. The desired functionalities can be obtained by using primary or secondary amino groups. The amines or alcohols are generally aromatic, aliphatic or alicyclic and contain between 1 to about 30, typically about 2 to about 15 and more typically about 2 to about 10 carbon atoms. These may contain additional substituents provided that they are not as reactive with isocyanate groups as the amine or alcohol groups. One suitable example is bis(2-methoxy ethyl)amine (BMEA).

Chain terminators and chain extenders can be used together, either as mixtures or as sequential additions to the NCO-prepolymer.

The amount of chain extender and/or chain terminator to be used in accordance with the present invention may be dependent upon the number of isocyanate groups in the prepolymer. Typically, the ratio of isocyanate groups of the prepolymer to isocyanate-reactive groups of the chain extender/terminator is between about 1.0 to about 0.6 and about 1.0 about 1.1, more typically between about 1.0 to about 0.7 and about 1.0 to about 1.1, on an equivalent basis. Any isocyanate groups that are not chain extended/terminated with an amine or alcohol will react with water, which functions as a chain extender.

The final product is a stable aqueous solution of polyurethane having a solids content of up to about 60% by weight, typically about 15 to about 60% by weight and most typically about 30 to about 40% by weight, based on the total dry polymer over the weight of the total aqueous solution. However, it is always possible to dilute the solution to any minimum solids content desired.

The nonionic polyurethane may also have ionic components incorporated into the polymer. In the case of anionic group substitution, the groups can be carboxylic acid groups, carboxylate groups, sulphonic acid groups, sulphonate groups, phosphoric acid groups and phosphonate groups, The acid salts are formed by neutralizing the corresponding acid groups either prior to, during or after formation of the NCO prepolymer, typically after formation of the NCO prepolymer.

Examples of carboxylic group-containing compounds are the hydroxy-carboxylic acids corresponding to the formula $(HO)_xQ(COOH)_y$, wherein Q represents a straight or branched hydrocarbon radical containing 1 to about 12 carbon atoms, x is 1 or 2 (typically 2), and y is 1 to 3 (typically 1 or 2).

Examples of these hydroxy-carboxylic acids include citric acid, tartaric acid and hydroxypivalic acid.

Especially preferred acids are those of the above-mentioned formula wherein x=2 and y=1. These dihydroxy alkanoic acids are described in U.S. Pat. No. 3,412,054, the disclosure of which is incorporated by reference herein for all purposes as if fully set forth. Especially preferred dihydroxy alkanoic acids are the alpha,alpha-dimethylol alkanoic acids represented by the structural formula:

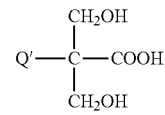

wherein Q' is hydrogen or an alkyl group containing 1 to about 8 carbon atoms. The most preferred compound is alpha,alpha-dimethylol propionic acid, i.e., wherein Q' is methyl in the above formula.

Suitable neutralizing agents for converting the acid groups to salt groups include tertiary amines, alkali metal cations and ammonia. Preferred neutralizing agents are potassium hydroxide and sodium hydroxide.

There may be limits to the amount of ionic component in the nonionic polyurethane, since the ionic component may complex with the multivalent cationic and form a complex that will lead to instability of the nonionic polymer/multivalent cationic solution. The non-ionic component should be the dominant component so that addition of polymer to multivalent cationic solution can lead to a stable solution. A screening test for whether a nonionic polymer is stable in the presence of the multivalent cationic salt solution is to mix about 10 wt % polymer and about 15 wt % of calcium nitrate tetrahydrate and observe whether the solution is stable. The stability observations may be performed at ambient temperature (~25)° and at 10 minutes and 24 hours.

The methoxylated carboxylated polyallylamine may have the chemical structure shown below. Typically, the number average molecular weight is about 5000 to about 25,000, more typically about 15,000.

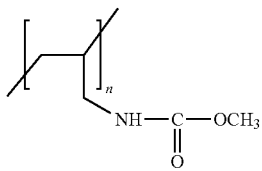

wherein n is about 50 to about 200, more typically about 100 to about 120. These methoxylated carboxylated polyallylamine are commercially available as PAA-U5000 from Nitto Boseki Co., Tokyo, Japan. The process for making the methoxylated carboxylated polyallyamine is known and is described in JP2005089488 entitled "Modified Polyallylamine with Good Cleanability and Printability and Their Manufacture" which is incorporated herein by reference for this purpose. The process can include reacting N-alkyldiallylamine-allylamine copolymers with dialkyl carbonates.

Typically, the water soluble predominantly non-ionic polymeric binder is added to the multivalent cationic salt solution and this polymer/multivalent cationic salt solution must be stable as a solution. If the nonionic polymer gels, or precipitates in the presence of the multivalent cationic salt solution, as described in the screening test above, then it cannot be used as a polymer additive for the fixer solution.

The salt stable, water soluble, predominantly non-ionic, polymeric binder is present in the amount of about 0.5% to about 10%, more typically about 1% to about 5%, based on the total weight of the fixer ink.

Ink Jet Ink Composition

Aqueous ink jet inks comprise a colorant, and an aqueous vehicle. The colorant may be a dye or a pigment dispersion. Dyes include disperse dyes, reactive dyes, acid dyes and the like. Typically, the pigment dispersion is an ionically stabilized pigment dispersion.

Aqueous Vehicle:

The aqueous vehicle is water or a mixture of water and at least one water-miscible organic solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl)ether, diethylene glycol mono-methyl (or -ethyl) ether, propylene glycol mono-methyl (or -ethyl) ether, triethylene glycol mono-methyl (or -ethyl)ether and diethylene glycol dimethyl (or -ethyl)ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

The amount of aqueous carrier medium in the ink is typically in the range of about 70% to about 99.8%, and typically about 80% to about 99.8%, based on total weight of the ink.

The aqueous carrier medium can be made to be fast penetrating (rapid drying) by including penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol monoisopropyl ether. 1,2-Alkanediols are typically 1,2-C4-6 alkanediols, most typically 1,2-hexanediol.

The amount of glycol ether(s) and 1,2-alkanediol(s) added must be properly determined, but is typically in the range of from about 1 to about 15% by weight and more typically about 2 to about 10% by weight, based on the total weight of the ink.

An aqueous vehicle will typically contain about 30% to about 95% water with the balance (i.e., about 70% to about 5%) being the water-soluble solvent. Fixer ink compositions typically contain about 60% to about 95% water, based on the total weight of the aqueous vehicle.

Other Ingredients

Other ingredients (additives) can be formulated into the fixer ink, to the extent that such other ingredients do not interfere with the stability and jettability of the finished ink, which may be readily determined by routine experimentation. Such other ingredients are in a general sense well known in the art.

Commonly, surfactants are added to the ink to adjust surface tension and wetting properties. Examples of suitable non-ionic surfactants include ethoxylated acetylene diols (e.g. Surfynols® series from Air Products), ethoxylated primary (e.g. Neodol® series from Shell and Tomadol® series from Tomah Products) and secondary (e.g. Tergitol® series from Dow Chemical) alcohols, Surfactants are typically used in the amount of about 0.01 to about 5% and typically about 0.2 to about 2%, based on the total weight of the ink.

Suitable cationic surfactants include, for example, quaternized ammonium or pyridinium surfactants, such as dodecyltrimethylammonium chloride, cetyltrimethylammonium bromide, cetyltrimethylpyridinium chloride and others.

Amphoteric surfactants that, within a certain pH range, are cationic may also be used. In this case the pH of the liquid composition must be adjusted below the isoelectric point of the surfactant. Some examples of useful zwitterionic surfactants include N,N-dimethyl-N-tetradecyl amine oxide (NTAO), N,N-dimethyl N-hexadecyl amine oxide (NHAO) and related amine oxide compounds. Another example is N-dodecyl-N,N-dimethyl glycine. Yet other examples include phosphates, phosphites, phosphonates, lecithins and the like, and phosphonate esters such as phosphomyelin.

Biocides may be used to inhibit growth of microorganisms. One suitable example is Proxel® GXL from Avecia, Machester, UK.

The components described above can be combined to make a fixer ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The fixer ink has physical properties adjusted to the ejecting conditions and printhead design. Drop velocity, separation length of the droplets, drop size and stream stability are greatly affected by the surface tension and the viscosity of the ink. Fixer inks typically have a surface tension in the range of about 20 dyne/cm to about 70 dyne/cm at 25° C. Viscosity can be as high as 30 cP at 25° C., but is typically somewhat lower. The fixer ink of this disclosure can be particularly advantageous for applications where low viscosity is required. Thus the viscosity (at 25° C.) of the inks can be less than about 7 cps, or less than about 5 cps, and even less than about 3 but typically no less than about 1 cps. The inks should have excellent storage stability for long periods so as not clog to a significant extent in an ink jet apparatus. Further, the ink should not corrode parts of the ink jet printing device it comes in contact with, and it should be essentially odorless and non-toxic.

Colorant:

The colorant may be a pigment dispersion, self dispersed pigment or a dye. The pigment dispersion comprises a pigment and a dispersant, more typically and ionically stabilized dispersant.

Suitable pigments are those generally well-known in the art for aqueous inkjet inks. Traditionally, pigments are stabilized by dispersing agents, such as polymeric dispersants or surfactants, to produce a stable dispersion of the pigment in the vehicle. More recently though, so-called "self-dispersible" or "selfdispersing" pigments (hereafter "SDP") have been developed. As the name would imply, SDPs are dispersible in water without dispersants. Dispersed dyes are also considered pigments as they are insoluble in the aqueous inks used herein.

The dispersant or surface treatment applied to the pigment creates an anionic surface charge ("anionic pigment dispersion"). Typically, that surface charge is imparted predominately by ionizable carboxylic acid (carboxylate) groups.

The dispersant used to stabilize the pigment is typically a polymeric dispersant. Either structured or random polymers may be used, although structured polymers are preferred for use as dispersants for reasons well known in the art. The term "structured polymer" means polymers having a block, branched or graft structure. Examples of structured polymers include AB or BAB block copolymers such as disclosed in U.S. Pat. No. 5,085,698; ABC block copolymers such as disclosed in EP-A-0556649; and graft polymers such as disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117. The disclosure of each of these publications is incorporated herein by reference for all purposes as if fully set forth. Polymer dispersants suitable for use in the present invention comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth)acrylate may be employed.

The pigment dispersions, wherein pigments are stabilized by addition of dispersing agents, may be prepared by methods known in the art. It is generally desirable to make the stabilized pigment in a concentrated form, which is subsequently diluted with a suitable liquid containing the desired additives. The pigment dispersion is first prepared by premixing the selected pigment(s), polymeric dispersant(s), a neutralizing agent specifically to ionize the carboxylic acid group contained in polymeric dispersant including alkaline bases (such as potassium hydroxide), or tertiary amines (such as dimethylethanol amine) in an aqueous carrier medium (such as water and, optionally, a water-miscible solvent, for example, triethylene glycol monobutyl ether), and then dispersing or deflocculating the pigment. The dispersing step may be accomplished in a 2-roll mill, media mill, a horizontal mini mill, a ball mill, an attritor, or by passing the mixture through a plurality of nozzles within a liquid jet interaction chamber at a liquid pressure of at least about 5,000 psi up to about 50,000 psi, typically about 15,000 to about 25,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ, and nylon. These various dispersion processes are in a general sense well-known in the art, as exemplified by, U.S. Pat. No. 5,022,592, U.S. Pat. No. 5,026,427, U.S. Pat. No. 5,310,778, U.S. Pat. No. 5,891,231, U.S. Pat. No. 5,679,138, U.S. Pat. No. 5,976,232 and US20030089277. All of these documents are incorporated by reference herein for all purposes as if fully set forth. Preferred are 2-roll mill, media mill, and by passing the mixture through a plurality of nozzles within a liquid jet interaction chamber at a liquid pressure of at least about 5,000 psi upto about 50,000 psi, typically about 15,000 to about 25,000 psi.

After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment. The determination of sufficient let down conditions is needed for all combinations of the polymeric dispersant, the solvent and the pigment.

After the dispersion preparation, the amount of water-miscible solvent may be more than some ink jet applications will tolerate. For some of the dispersions, it thus may be necessary to ultrafilter the final dispersion to reduce the amount of water-miscible solvent. To improve stability and reduce the viscosity of the pigment dispersion, it may be heat treated by heating from about 30° C. to about 100° C., with the preferred temperature being about 70° C. for about 10 to about 24 hours. Longer heating does not affect the performance of the dispersion.

The amount of polymeric dispersants required to stabilize the pigment is dependent upon the specific polymeric dispersants, the pigment and vehicle interaction. The weight ratio of pigment to polymeric dispersants will typically range from about 0.5 to about 6. A preferred range is about 0.75 to about 4.

More recently though, so-called "self-dispersible" or "self-dispersing" pigments (hereafter "SDP") have been developed. As the name would imply, SDPs are dispersible in water, or vehicle, without dispersants. See, for example, U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No. 6,153,001, U.S. Pat. No. 6,221,141, U.S. Pat. No. 6,221,142, U.S. Pat. No. 6,221,143, U.S. Pat. No. 6,277,183, U.S. Pat. No. 6,281,267, U.S. Pat. No. 6,329,446, U.S. Pat. No. 6,332,919, U.S. Pat. No. 6,375,317, US2001/0035110, EP-A-1086997, EP-A-1114851, EP-A-1158030, EP-A-1167471, EP-A-1122286, WO01/10963, WO01/25340 and WO01/94476, the disclosures of which are incorporated by reference herein for all purposes as if fully set forth.

A pigment may be stabilized to dispersion by surface treatment to be self-dispersing (see, for example, previously incorporated WO 01/94476), by treatment with dispersant in the traditional way, or by some combination of surface treatment and dispersant.

Examples of quaternary self-dispersed pigments include those with pendant quaternized amine groups. The preparation of such pigments is described in U.S. Pat. No. 5,851,280 and U.S. Pat. No. 6,221,143 (the disclosures of which are incorporated by reference herein for all purposes as if fully set forth).

Representative commercial pigments in dry form include the following:

| TRADE NAME | MANUFACTURER | COLOR INDEX (CI) PIGMENT NAME |
|---|---|---|
| PERMANENT YELLOW DHG | HOECHST | YELLOW 12 |
| PERMANENT YELLOW GR | HOECHST | YELLOW 13 |
| PERMANENT YELLOW G | HOECHST | YELLOW 14 |
| PERMANENT YELLOW NCG-71 | HOECHST | YELLOW 16 |
| PERMANENT YELLOW NCG-71 | HOECHST | YELLOW 16 |
| PERMANENT YELLOW GG | HOECHST | YELLOW 17 |
| HANSA YELLOW RA | HOECHST | YELLOW 73 |
| HANSA BRILLIANT YELLOW 5GX-02 | HOECHST | YELLOW 74 |
| DALAMAR ® YELLOW YT-858-D | HEUBACH | YELLOW 74 |
| HANSA YELLOW X | HOECHST | YELLOW 75 |
| NOVOPERM ® YELLOW HR | HOECHST | YELLOW 83 |
| CHROMOPHTAL ® YELLOW 3G | CIBA-GEIGY | YELLOW 93 |
| CHROMOPHTAL ® YELLOW GR | CIBA-GEIGY | YELLOW 95 |
| NOVOPERM ® YELLOW FGL | HOECHST | YELLOW 97 |
| HANSA BRILLIANT YELLOW 10GX | HOECHST | YELLOW 98 |
| PERMANENT YELLOW G3R-01 | HOECHST | YELLOW 114 |
| CHROMOPHTAL ® YELLOW 8G | CIBA-GEIGY | YELLOW 128 |
| IRGAZIN ® YELLOW 5GT | CIBA-GEIGY | YELLOW 129 |
| HOSTAPERM ® YELLOW H4G | HOECHST | YELLOW 151 |
| HOSTAPERM ® YELLOW H3G | HOECHST | YELLOW 154 |
| L74-1357 YELLOW | SUN CHEM | |
| L75-1331 YELLOW. | SUN CHEM | |
| L75-2377 YELLOW | SUN CHEM. | |
| HOSTAPERM ® ORANGE GR | HOECHST | ORANGE 43 |
| PALIOGEN ® ORANGE | BASF | ORANGE 51 |
| IRGALITE ® RUBINE 4BL | CIBA-GEIGY | RED 57:1 |
| QUINDO ® MAGENTA | MOBAY | RED 122 |
| INDOFAST ® BRILLIANT SCARLET | MOBAY | RED 123 |
| HOSTAPERM .RTM. SCARLET GO | HOECHST | RED 168 |
| PERMANENT RUBINE F6B | HOECHST | RED 184 |
| MONASTRAL ® MAGENTA | CIBA-GEIGY | RED 202 |
| HELIOGEN .RTM. BLUE L 6901F | BASF | BLUE 15:2 |
| HELIOGEN ® BLUE NBD 7010 | BASF | |
| HELIOGEN ® BLUE K 7090 | BASF | BLUE 15:3 |
| HELIOGEN ® BLUE L 7101F | BASF | BLUE 15:4 |
| PALIOGEN ® BLUE L 6470 | BASF | BLUE 60 |
| HEUCOPHTHAL ® BLUE G, XBT-583D | HEUBACH | BLUE 15:3 |
| HELIOGEN ® GREEN K 8683 | BASF | GREEN 7 |
| HELIOGEN ® GREEN L 9140 | BASF | GREEN 36 |
| MONASTRAL ® VIOLET R | CIBA-GEIGY | VIOLET 19 |
| MONASTRAL ® RED B | CIBA-GEIGY | VIOLET 19 |
| QUINDO ® RED R6700 | MOBAY | |
| QUINDO ® RED R6713 | MOBAY | |
| INDOFAST ® VIOLET | MOBAY | VIOLET 23 |
| MONASTRAL ®. VIOLET MAROON B | CIBA-GEIGY | VIOLET 42 |
| SPECIAL BLACK 4A | DEGUSSA | BLACK 7 |
| STERLING ® NS 76 BLACK | CABOT | BLACK 7 |
| STERLING ® NSX 76 | CABOT | BLACK 7 |
| MOGUL L | CABOT | BLACK 7 |

Representative commercial pigments available in the form of a water-wet presscake include: Heucophthal® Blue BT-585-P, Toluidine Red Y (C.I. Pigment Red 3), Quindo® Magenta (Pigment Red 122), Magenta RV-6831 presscake (Mobay Chemical, Harmon Division, Haledon, N.J.), Sunfast® Magenta 122 (Sun Chemical Corp., Cincinnati, Ohio), Indo® Brilliant Scarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Hansa® Yellow (Pigment Yellow 98), Dalamar® Yellow YT-839-P (Pigment Yellow 74, C.I. No. 11741, Sunbrite® Yellow 17 (Sun Chemical Corp, Cincinnati, Ohio), Toluidine Yellow G (C.I. Pigment Yellow 1), Pigment Scarlet (CI Pigment Red 60), Auric Brown (CI Pigment Brown 6), etc. Black pigments, such as carbon black, generally are not available in the form of aqueous presscakes.

Cationic dyes typically have a structural skeleton of cyanine, azo, azomethine, xanthene, triphenylmethane, methine, polymethine, phthalocyanine, or the like. Cationic dyes include C.I. Basic Yellow 1, C.I. Basic Yellow 11, C. I. Basic Yellow 13, C.I. Basic Yellow 19, C.I. Basic Yellow 21, C.I. Basic Yellow 25, C.I. Basic Yellow 33, C.I. Basic Yellow 36, C.I. Basic Red 1, C.I. Basic Red 2, C.I. Basic Red 9, C.I. Basic Red 12, C.I. Basic Red 13, C.I. Basic Red 38, C.I. Basic Red 39, C.I. Basic Red 92, C.I. Basic Blue 1, C.I. Basic Blue 3, C.I. Basic Blue 5, C.I. Basic Blue 9, C. I. Basic Blue 19, C.I. Basic Blue 24, C.I. Basic Blue 25, C.I. Basic Blue 26, C.I. Basic Blue 28, C.I. Basic Blue 45, C.I. Basic Blue 54, and C.I. Basic Blue 65. These dyes may be used in combination for preparation of a black ink.

Anionic dyes include Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 86, Direct Yellow 132, Direct Yellow 142, Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 256, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, Direct Red 243, Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, Direct Blue 199.

The black colorant may also be a dye as, for example, the black dye disclosed in U.S. Pat. No. 5,753,016, the disclosure of which is herein incorporated by reference. The black colorant may also be a combination of dye and pigment as, for example, disclosed in previously incorporated U.S. Pat. No. 6,277,184.

Other Ingredients:

Other ingredients may be formulated into the inkjet ink, to the extent that such other ingredients do not interfere with the stability and jettablity of the ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell and Tomadol® series from Tomah Products) and secondary (e.g. Tergitol® series from Dow Chemical) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and typically about 0.2 to about 2%, based on the total weight of the ink.

Biocides may be used to inhibit growth of microorganisms. One suitable example is Proxel GXL from Avecia, Machester, UK.

Inclusion of sequestering (or chelating) agents such as ethylenediaminetetraacetic acid (EDTA), iminodiacetic acid (IDA), ethylenediamine-di(ohydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamineN,N,N',N'-tetraacetic acid (GEDTA), and salts thereof, may be advantageous, for example, to eliminate deleterious effects of heavy metal impurities. The inks can contain compatible polymers other than pigment dispersant and co-reactive species. The oligomers or polymers can be based on acrylic, urethane, polyester, polyamide, polyvinyl, polyether, polyamine and cellulosic structures; the polymer or oligomer structures could include random, block, branched, star or dendrimer structures. They can be soluble, or present as a dispersion, latex or hydrosol. The latex or dispersion particles can have a homogeneous or core/shell structure.

Ink Properties:

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C. (30 cP or less), but is typically somewhat lower. The physical properties of the ink are adjusted to the ejecting conditions and print-head design. The inks should have excellent storage stability for long periods so as not clog to a significant extent in an ink jet apparatus. Further, the ink should not corrode parts of the inkjet-printing device it comes in contact with, and it should be essentially odorless and non-toxic.

The ink set of this invention can be particularly advantageous for applications where low viscosity is required. Thus the viscosity (at 25° C.) of the inks can be less than about 7 cps, or less than about 5 cps, and even less than about 3.5 cps.

Proportions of Ingredients:

The components described above and below may be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or nonaqueous, is typically in the range of about 70% to about 99.8%, and more typically about 80% to about 99.8%, based on total weight of the ink.

In a colored ink, colorant will generally be present in amounts up to about 12%, and more typically in the range of about 0.1 to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the ink. surfactants, when added, are generally in the range of about 0.2 to about 3% by weight based on the total weight of the ink. Polymers other than pigment dispersant and co-reactive species can be added as needed, but will generally be less than about 15% by weight based on the total weight of the ink.

Ink Sets:

The term "ink set" refers to all the individual inks or other fluids, example the fixer ink of this disclosure, an inkjet printer is equipped to jet.

In one typical embodiment, the ink set comprises the fixer ink and at least two differently colored inkjet inks. More typically ink sets comprise the fixer ink and at least three differently colored inks (such as CMY), and still more typically the fixer ink and at least four differently colored inks (such as CMYK).

In addition to the CMYK inks mentioned above, the ink sets may contain additional differently colored inks, as well as different strength versions of the CMYK and other inks.

For example, the inks sets of the present invention can comprise full-strength versions of one or more of the inks in the ink set, as well as "light" versions thereof.

Additional colors for the inkjet ink set may include, for example, white, or ange, violet, green, red and/or blue.

In a specific embodiment of the present disclosure, there is provided an ink set comprising an ink comprising an anionically stabilized pigment ink and the fixer ink of the disclosure. In another embodiment, an ink set comprises plural, differently colored ionically stabilized dispersion based pigment inks and a fixer ink.

The disclosure provides a method for printing a substrate, comprising:
(a) providing an in ink set, comprising:
an aqueous colorant containing ink jet ink;
a fixer ink comprising:
 (i) a multivalent metal salt, wherein the metal is selected from the group consisting of divalent metal ions such as $Ga^{2+}$, $Cu^{2+}$, $Ni^{2+}$, $Mg^{2+}$, $Zn^{2+}$ and $Ba^{2+}$, trivalent metal ions, such as $Al^{3+}$, $Fe^{3+}$ and $Cr^{3+}$, and mixtures thereof; and
 (ii) a salt stable, water soluble, predominantly non-ionic, polymeric binder selected from the group consisting of a polyurethane comprising an ethylene oxide unit, and a methoxylated carboxylated polyallylamine; wherein the polymeric binder is substantially non-reactive with the colorant;
(b) applying the ink jettable fixer ink to the substrate, and
(c) applying the aqueous colorant containing ink jet ink to the substrate.

The fixer ink may be jetted under and/or over a colored ink to enhance the coloristic or durability properties. Generally a fixer for pigments is designed to increase chroma and/or optical density. However, fixers may also have other and/or additional beneficial effects.

The description of illustrative and preferred embodiments of the present disclosure is not intended to limit the scope of the disclosure. Various modifications, alternative constructions and equivalents may be employed without departing from the true spirit and scope of the appended claims. This disclosure now will be further illustrated, but not limited, by the following examples.

The following Examples illustrate certain embodiments of the disclosure. All parts, percentages and proportions are by weight unless otherwise indicated.

EXAMPLES

Ingredients and Abbreviations

DMPA=dimethylol propionic acid
IPDI=isophoronediisocyanate
BMEA=bis(2-methoxy ethyl)amine
Tetraglyme=tetraethylene glycol dimethyl ether
THF=tetrahydrofuran Unless otherwise noted, the above chemicals were obtained from Aldrich
(Milwaukee, Wis.) or other similar suppliers of laboratory chemicals. Liponic™ EG-1—ethoxylated glycerin humectant from Lipo Chemicals Inc. (Patterson, N.J.)
Surfynol® 465—acetylene glycol nonionic surfactant from Air Products (Allentown, Pa.)
Tergitol 15-S-7—secondary alcohol ethoxylate a nonionic surfactant from Dow Chemical (Midland, Mich.)
Terathane® 1400—a polytetramethylene oxide polyol from Invista (Wichita, Kans.)
Tegomer D3403—Polyether diol from Evonik Industries (Essen, Germany)
PAA-U5000—Methoxycarbonylated polyallylamine from Nitto Boseki Co. (Tokyo, Japan)
Pulset JK-177—Dimethylamine-epichlorohydrin copolymer from Esprix technologies (Sarasota, Fla.)
Proxel® GXL 0 20% aqueous dipropylene glycol solution preservative from Avecia (Manchester, UK).

Polymeric Dispersants:

The following example was based on group transfer polymerization (GTP), although other types of polymerization processes can be used to generate similar types of polymer.

Standard laboratory techniques were employed for the following examples.

The acid value was determined by titration and was reported as meq/gram of polymer solids. Molecular weight was determined by GPC. The GPC separations were carried out using a four column set consisting of two 500-A, and two 100-A 30 cm×7.8 mm i.d. Microstyragel columns (Waters, Milford, Mass.). The THF mobile phase was delivered by a Hewlett-Packard (PaloAlto, Calif.) model 1090 gradient liquid chromatograph at a flowrate of 1.0 mL/min. The eluting species were detected using a Hewlett-Packard 1047A differential refractive detector. Narrow low-molecular-weight poly (methylmethacrylate) standards were used as calibrants. The particle size was determined by dynamic light scattering using a Microtrac Analyzer, Largo Fla. For many of the dispersion steps, a Model 100 F or Y, Microfluidics System was used (Newton Mass.)

It should be noted that, in referring to the polymer compositions, a double slash indicates a separation between blocks and a single slash indicates a random copolymer. Thus, for example, BZMA/MAA 90/10 is a random copolymer having about 90 wt % benzyl methacrylate (BZMA) and about 10 wt % methacrylic acid (MAA) units in the final polymer.

Polymer 1a: BZMA/MAA 90/10 Random Linear Copolymer

A 5-liter flask was equipped with a mechanical stirrer, thermometer, $N_2$ inlet, drying tube outlet, and addition funnels. THF, 1715.1 g, was charged to the flask. The catalyst (tetrabutyl ammonium m-chlorobenzoate, 1.2 ml of a 1.0 M solution in acetonitrile) was then added. Initiator (1-methoxy-1-trimethylsiloxy-2-methyl propene, 51.33 g (0.295 moles)) was injected. Feed I (tetrabutyl ammonium m-chlorobenzoate, 1.2 ml of a 1.0 M solution in acetonitrile and THF, 10.0 g) was started and added over 180 minutes. Feed II (trimethylsilyl methacrylate, 267.6 g (1.69 moles) and benzyl methacrylate (BZMA), 1305.6 g (7.42 moles)) was started at 0.0 minutes and added over 70 minutes.

At 173 minutes, 60.5 g of methanol were added to the above solution and distillation begun. During the first stage of distillation, 503.0 g of material were removed. The final polymer solution was 51.5% solids.

The polymer had a composition of BZMA/MAA 90/10; molecular weight (Mn) of 5048; and an acid value of 1.24 (milliequivalents/gram of polymer solids) based on total solids.

Polymer 1 b: BZMA/MAA 90/10 Random Linear Copolymer with 2-pyrrolidone as Final Solvent In a 2 liter flask, 1000 g of Polymer 1a solution were added. The solution was heated to reflux and 284 g of solvent were distilled off. Then 221 g of 2-pyrrolidone were added to the flask. After another 156 g of solvent were distilled off, 266 g of 2-pyrrolidone were added to make a polymer solution of 47% solids.

Dispersion Preparation—Black Dispersion (PD1)

An aqueous black pigment dispersion was prepared by mixing the following ingredients with adequate stirring:

| INGREDIENT | AMOUNT (G) |
| --- | --- |
| Polymer 1b | 268.3 |
| Potassium hydroxide (4.5% solids) | 239.4 |
| Deionized water | 1142 |
| Carbon black (FW-18 Degussa) | 330 |
| Triethyleneglycol monobutyl ether | 220 |

These ingredients were well mixed and dispersed with a Microfluidics System to yield a 15 wt % pigment solids dispersion. The dispersion was then purified by removing excess solvent, Triethyleneglycol monobutyl ether, through an ultrafiltration process to yield a 9.86 wt % pigment solids dispersion that has less than 1.0 wt % of solvent (other than water), and an average particle size of 107 nm.

Inkjet Ink Preparation (Ink A):

An Ink was prepared by mixing the following ingredients with adequate stirring:

| INGREDIENT | AMOUNT (G) |
| --- | --- |
| PD1 | 30.4 |
| 1,2-hexanediol | 4 |
| Glycerol | 10 |
| Ethylene glycol | 5 |
| Liponic ™ EG-1 | 5 |
| Surfynol ® 465 | 0.5 |
| Proxel GXL | 0.2 |
| Deionized water | 44.9 |

This made an ink that contained 3.0 wt % pigment.

Water Soluble Polyurethane with Ethylene Oxide Unit (PU)

To a dry, alkali- and acid-free flask, equipped with an addition funnel, a condenser, stirrer and a nitrogen gas line, was added 130 g Terathane 1000, 65 g Tegomer D3403 and 6 g DMPA to dissolve in 54 g Tetraglyme solvent The contents were heated to 70° C. and mixed well. 60 g IPDI were then added to the flask via the addition funnel over 60 min, with any residual IPDI being rinsed from the addition funnel into the flask with 5 g Tetraglyme.

The flask temperature was raised to 80° C., then held at 80° C. until NCO % was less than 1.3%. Then, 11 g BMEA were added over 5 minutes. After 2 hr at 80° C., the polyurethane solution was inverted under high speed mixing by adding 100 g 2.5% KOH water solution followed by an additional 450 g water. The polyurethane solution had a viscosity of 18.6 cps, 29.6% solids, acid value of 0.17 and 22 wt % of ethylene oxide unit based on polymer solid.

Fixer Ink Preparation:

Fixer inks were prepared by mixing the following ingredients shown in Table 1 with adequate stirring. Weight percentage was based on solid weight of the ingredient.

Fixer 1 (comp 1) contains an organic cationic substance, N-methylmorpholine neutralized by methane sulfonic acid as the fixing agent. Fixer 2 (comp 2) contains calcium nitrate hydrate, which is a multivalent salt, as the fixing agent. Fixer 3 (comp 3) contains Pulset®JK-177, a cationic polymer, dimethylamine-epichlorohydrin copolymer from Esprix technologies and calcium nitrate hydrate as the fixing agent Fixer 4 contains the calcium nitrate hydrate and nonionic polyurethane (PU) as the fixing agent. Fixer 5 contains the calcium nitrate hydrate and non-ionic methoxylated carboxylated polyallylamine (PAA-U5000) as the fixing agent.

TABLE 1

Fixer Ink Formulation

| Ingredients (%) | Fixer 1 (Comp 1) | Fixer 2 (Comp 2) | Fixer 3 (Comp 3) | Fixer 4 | Fixer 5 |
| --- | --- | --- | --- | --- | --- |
| PAA-U5000 | | | | | 2.0 |
| PU | | | | 3.5 | |
| Pulset ® JK-177 | | | 4.0 | | |
| N-methylmorpholine | 3.5 | | | | |
| Calcium nitrate hydrate | | 3.5 | 2.0 | 3.5 | 3.5 |
| 2-Pyrrolidone | 4.0 | 4.0 | 4.0 | 4.0 | 4.0 |
| Tetraethylene glycol | 6.0 | 6.0 | 6.0 | 6.0 | 6.0 |
| 1,5 pentanediol | 10.0 | 10.0 | 10.0 | 10.0 | 10.0 |
| Tergitol ® 15-S-7 | 1.25 | 1.25 | 1.25 | 1.25 | 1.25 |
| Proxel ® GXL | 0.2 | 0.2 | 0.2 | 0.2 | 0.2 |
| Methane Sulfonic Acid (to pH 4.5) | As needed | | | | |
| Water (balance to 100%) | Balance | Balance | Balance | Balance | Balance |

TABLE 2

Fixer Ink Properties

|  | Fixer 1 (Comp 1) | Fixer 2 (Comp 2) | Fixer 3 (Comp 3) | Fixer 4 | Fixer 5 |
|---|---|---|---|---|---|
| Viscosity (cps) | 2.48 | 2.22 | 2.55 | 3.10 | 3.25 |
| pH | 4.40 | 7.05 | 5.20 | 6.00 | 9.94 |
| Surface tension (mN/m) | 29.7 | 2.98 | 29.7 | 32.3 | 30.1 | formed one hour after printing the test pattern. The stripes were inspected from smear-fastness according to the following ordinal scale and the highest applicable ranking applied:

5=No smear visible
4=slight smear, narrow, doesn't run clear to next stripe
3=moderate smear, may be full width of highlighter, but light in color
2=noticeable smear, runs full width of area between stripes
1=severe smear, considerable color transfer, may be some damage to stripe
0=Ink largely removed from stripe with highlighter Table 3 summarized OD and smear-fastness results.

TABLE 3

| Fixer | | Fixer Ink applied (0%) | Fixer Ink applied (20%) | Fixer Ink applied (30%) | Fixer Ink applied (50%) | Fixer Ink applied (100%) |
|---|---|---|---|---|---|---|
| Fixer 1 (comp 1) | OD | 0.94 | 1.12 | 1.25 | 1.26 | 1.37 |
| | Smear fastness | 5.0 | 4.0 | 4.0 | 3.5 | 3.0 |
| Fixer 2 (comp 2) | OD | 0.94 | 1.35 | 1.48 | 1.59 | 1.55 |
| | Smear fastness | 5.0 | 3.5 | 2.5 | 1.5 | 2.0 |
| Fixer 3 (comp 3) | OD | 0.94 | 1.39 | 1.51 | 1.55 | 1.57 |
| | Smear fastness | 5.0 | 3.0 | 2.5 | 2.5 | 2.0 |
| Fixer 4 | OD | 0.94 | 1.25 | 1.36 | 1.50 | 1.53 |
| | Smear fastness | 5.0 | 5.0 | 4.0 | 4.0 | 3.5 |
| Fixer 5 | OD | 0.94 | 1.01 | 1.24 | 1.48 | 1.58 |
| | Smear fastness | 5.0 | 4.0 | 4.0 | 3.5 | 3.5 |

Example 1-5

Ink A with Fixer 1-Fixer 5 were printed under various print conditions. The substrate used in all print tests was Xerox 4200 plain paper.

One pass printing was performed on a printing apparatus consisting of two Canon I-960 inkjet printheads mounted in fixed position above a rotating drum to which the substrate was attached. The two printheads were aligned to print on the same area of the substrate and were approximately 1 cm wide, producing a printed stripe of the same width. The print condition was set to print the fixer from one printhead immediately followed by printing of ink from the second head on top of the freshly printed ("wet") fixer. The amount of ink applied was estimated to be about 17 μg/mm². Different levels of fixer coverage were tested. The amount of fixer applied varied from 20%, 33%, 50% and 100% relative to amount of ink applied which corresponded to about 3.4, 5.7, 8.5 and 17 μg/mm². A test with ink only, no fixer ("0% coverage") was repeated as part of each series of tests with different fixer.

Optical densities were measured with a Greytag-Macbeth SpectroEye (Greytag-Macbeth AG, Regensdorf, Switzerland).

Highlighter Smear Resistance Measurement:

To determine smear, a pattern consisting of three 1 cm wide parallel stripes spaced about 7 mm apart were printed. Two strokes from a highlighter, one on top of the other, were drawn across the five printed lines. Highlighter pen used was Sharpie® Accent® alkaline based. This testing was per- The results in Table 3 and FIG. 1 show increase in OD when the fixer is printed with the ink compared to OD when no fixer is printed with the ink. For all fixers, OD continues to increase with a higher amount of fixer printed. As demonstrated in FIG. 1, for fixer 4 and fixer 5, smear resistance rating does not decrease as sharply as for the comparative fixers (see Comp 1, Comp 2 and Comp 3). In other words, at similar OD levels, the fixers of this disclosure have better smear resistance.

What is claimed is:

1. An ink set for ink jet printing, comprising: an ink jettable ink and an ink jettable fixer ink; wherein
said ink jettable ink comprises an aqueous colorant; and
said ink jettable fixer ink comprises:
(i) a multivalent metal salt, wherein the metal is selected from the group consisting of divalent metal ions, trivalent metal ions, and mixtures thereof; and
(ii) a salt stable, water soluble, predominantly non-ionic, polymeric binder, wherein said polymeric binder is a polyurethane comprising an ethylene oxide unit and has an average number molecular weight of about 5000 to about 25,000; and wherein the polymeric binder is substantially non-reactive with the colorant.

2. The ink set of claim 1 wherein the colorant comprises a dye, a self dispersed pigment or a pigment dispersion.

3. The ink set of claim 2 wherein the pigment dispersion comprises a pigment and an ionically stabilized dispersant.

4. The ink set of claim 1 wherein the fixer ink is substantially colorless.

5. The ink set of claim 1 wherein the divalent metal ions are selected from the group consisting of $Ca^{2+}$, $Cu^{2+}$, $Ni^{2+}$, $Mg^{2+}$, $Zn^{2+}$ and $Ba^{2+}$.

6. The ink set of claim 1 wherein the trivalent metal ions are selected from the group consisting of $Al^{3+}$, $Fe^{3+}$ and $Cr^{3+}$.

7. The ink set of claim 1 wherein the multivalent metal salt is present in the amount of about 0.5% to about 15%, based on the total weight of the fixer ink.

8. The ink set of claim 1 wherein the polyurethane comprising an ethylene oxide unit comprises a nonionic component.

9. The ink set of claim 8 wherein the nonionic component is selected from the group consisting of ethylene oxide and ethylene oxide derivatives.

10. The ink set of claim 1 wherein the polyurethane comprising an ethylene oxide unit further comprises an ionic component.

11. The ink set of claim 10 wherein the ionic component is an acid.

12. The ink set of claim 11 wherein the acid is dimethylolpropionic acid.

13. The ink set of claim 1 wherein said polyurethane further comprises a methoxylated carboxylated polyallylamine having the chemical structure:

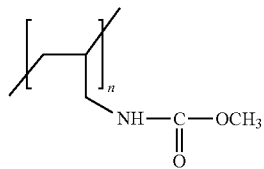

wherein n is an integer between 50 and 200.

14. The ink set of claim 13 wherein n is an integer between 100 and 120.

15. The ink set of claim 13 wherein the methoxylated carboxylated polyallylamine has a number average molecular weight of about 5000 to about 25,000.

16. The ink set of claim 1 wherein the salt stable, water soluble, predominantly non-ionic, polymeric binder is present in the amount of about 0.5% to about 10%, based on the total weight of the fixer ink.

17. The ink set of claim 1 wherein the fixer ink further comprises a surfactant.

18. The ink set of claim 1 wherein the fixer ink further comprises an aqueous vehicle.

19. The ink set of claim 1 wherein the methoxylated carboxylated polyallylamine has a number average molecular weight of from about 7000 to about 25,000.

20. A method for printing on a substrate comprising:
(a) providing an ink set, comprising an ink jettable ink and an ink jettable fixer ink; wherein said ink jettable ink comprises an aqueous colorant; and said ink jettable fixer ink comprises:
    (i) a multivalent metal salt, wherein the metal is selected from the group consisting of divalent metal ions such as $Ca^{2+}$, $Cu^{2+}$, $Ni^{2+}$, $Mg^{2+}$, $Zn^{2+}$ and $Ba^{2+}$, trivalent metal ions, such as $Al^{3+}$, $Fe^{3+}$ and $Cr^{3+}$, and mixtures thereof; and
    (ii) a salt stable, water soluble, predominantly non-ionic, polymeric binder, wherein said polymeric binder is a polyurethane comprising an ethylene oxide unit and has an average number molecular weight of about 5000 to about 25,000; wherein the polymeric binder is substantially non-reactive with the colorant;
(b) applying the ink jettable fixer ink to the substrate, and
(c) applying the aqueous colorant containing ink jettable ink to the substrate.